United States Patent [19]

Smart, deceased

[11] Patent Number: 4,564,353

[45] Date of Patent: Jan. 14, 1986

[54] CONTINUOUS VULCANIZATION AND/OR CROSS-LINKING APPARATUS

[75] Inventor: Gerald Smart, deceased, late of Whitefield, England, by Doris M. Smart, administratrix

[73] Assignee: General Engineering Radcliffe 1979 Ltd., Manchester, England

[21] Appl. No.: 181,743

[22] Filed: Aug. 27, 1980

[30] Foreign Application Priority Data

Sep. 1, 1979 [GB] United Kingdom ................. 7930380

[51] Int. Cl.⁴ .............................................. B29F 3/10
[52] U.S. Cl. .................................. 425/446; 425/383; 264/236; 264/347
[58] Field of Search ............... 422/200, 202, 234, 243, 422/26, 28, 300, 131, 137, 138; 118/316, 326, DIG. 11; 425/445, 71, 446, 383; 264/174, 236, 347

[56] References Cited

U.S. PATENT DOCUMENTS

| | | | |
|---|---|---|---|
| 2,542,623 | 2/1951 | Cahen | 118/326 |
| 3,424,125 | 1/1969 | Wiggins | 118/326 X |
| 3,667,995 | 6/1972 | Kaufman et al. | 118/326 X |
| 3,773,872 | 11/1973 | Isshiki et al. | 264/236 |
| 3,908,593 | 9/1975 | Rossi et al. | 118/DIG. 11 |
| 4,029,450 | 6/1977 | Caser | 264/347 |
| 4,127,370 | 11/1978 | Jackson | 425/71 |

FOREIGN PATENT DOCUMENTS 44-11534  5/1969  Japan .................................. 425/445

Primary Examiner—David L. Lacey
Attorney, Agent, or Firm—William R. Hinds

[57] ABSTRACT

Apparatus for treatment of elastomers and polymers has an inner tube of rectangular section in an outer tubular shell. A treatment medium, for example, a liquid mixture of eutectic salts, is circulated by a pump from a reservoir to a manifold and then to the tube to fill the tube apart from its ends. The medium issues from the ends of the tube into the shell from which it drains to the reservoir. Conveyors are arranged to feed an elongate article through the tube. A hot, gaseous wipe is provided by a device. The interior of the shell is filled with gas under pressure through an inlet. A pressurized water cooling system is included.

8 Claims, 5 Drawing Figures

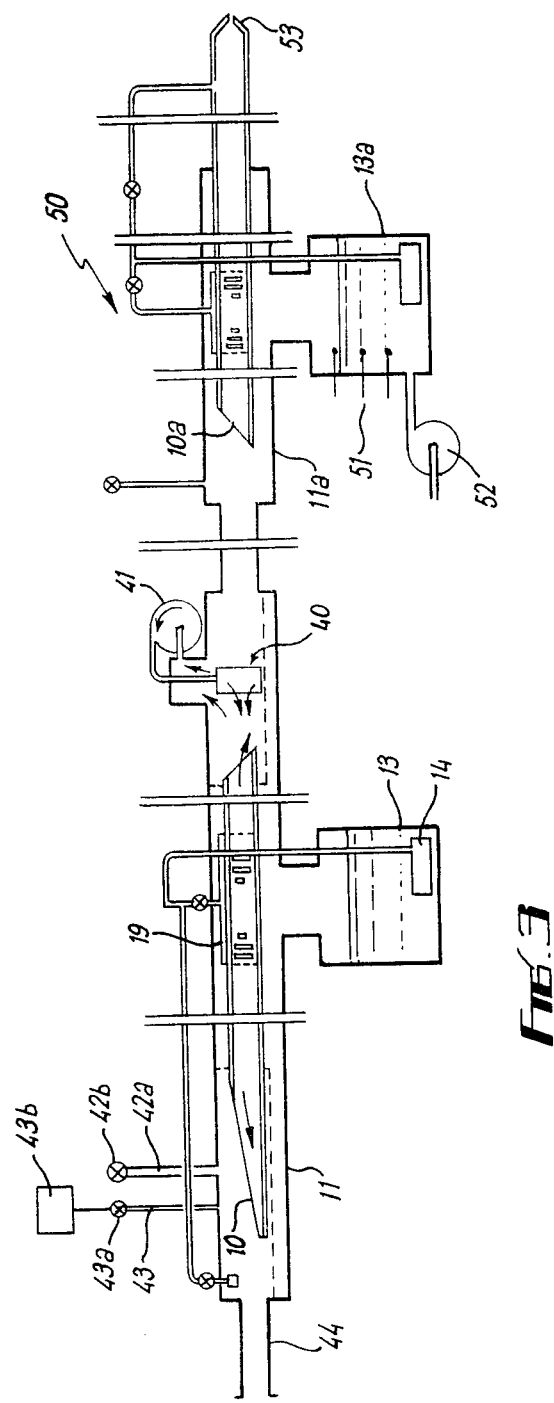

CONTINUOUS VULCANIZATION AND/OR CROSS-LINKING APPARATUS

This invention relates to systems for the continuous vulcanisation and/or cross-linking of elastomers and polymers examples of which are natural rubber compositions and synthetic compositions such as polychloroprene (neoprane), chlorosulfonated polyethylene, silicon rubbers, and crosslinkable polyethylehe such as Union Carbide XLPE No. 4201.

Continuous vulcanising systems have one application in the art of vulcanising extruded rubber sections of various cross-sections which are used for example in the motor industry for door and window seals. Known devices for carrying out this operation consist basically of an elongated bath of about 10 to 20 meters in length which is filled with a heated vulcanising medium (generally a eutectic mixture of inorganic salts) or a liquid such as polyakylene glycol, or a material such as very small glass beads, known as ballotini, which can be put into a fluidized state. Such systems operate at atmospheric pressure and require special attention to the composition of the material being processed (use of dessicants for example) and special vented extruders. Another application of a continuous system is in the manufacture of such products as electrical cables with vulcanisable insulation or sheathing, and rubber hose, with or without reinforcements such as textile and metallic braids. Such systems combine high temperatures typically between 180° C. and 300° C. with the use of pressures above atmospheric in the process and eliminate the need for dessicants and vented extruders. The problems of continuous systems have been well considered in the literature (see for example an article by G.Smart entitled "Dry Curing of XLP Cables" in Wire Industry for August 1979 and Rubber Division—Paper No. 127 of the American Chemical Society presented at their October 1978 meeting; see also British Patent Specifications Nos. 1168028; 1212255; 1219259; 1479027; 1342243 and 1486957 and U.S. Pat. Nos. 3903327; 3995583 and 4029450).

Systems which use treatment mediums which can be heated without regard to pressure and are designed such that pressure can, if necessary, be applied, without dependence on the temperature of the system, offer many advantages to the processor.

The present invention provides a continuous vulcanising and/or cross linking system which gives advantages over the present art when considering both the vulcanising of rubber sections at atmospheric pressure, and the vulcanising of cable and hose constructions (the latter employing a flexible mandrel when so produced) in a pressurised system.

According to the invention apparatus for continuous vulcanising and/or cross linking comprises elongated tube means and means for circulating a treatment medium characterised in that the elongated tube means is positioned inside an outer shell, the circulating means is adapted to circulate the medium at a rate sufficient to fill completely the tube means, the outer shell being positioned to receive the medium issuing from the ends of the tube means, and in that the circulating means comprises a reservoir positioned to receive continuously treatment medium which drains from the outer shell.

The treatment medium may, for example, by a eutectic mixture of inorganic salts. Means may be provided for continuously feeding the product to be treated through the inner tube, where it is subjected to the heat required for vulcanisation or cross-linking.

Both the shell and inner tube are preferably positioned straight and horizontal.

Preferably, where the product emerges from the inner tube, means are provided to apply a high temperature gaseous wipe to the product to remove as much of the adhering liquid deposits as is practicable while still within the confines of the outer shell, from where such removed deposits drain to the reservoir.

The inner tube is preferably of rectangular section, with the major axis in the vertical plane so as to permit unrestrained vertical movement (within the limits of the dimenions) of the product and also to facilitate the provision of a tensioned draw wire necessary for the threading of the tube.

A continuous system according to the invention can be operated under pressure (the pressurising medium being compressed air, nitrogen, or other gases depending on the nature of the material being processed) and when so operated the advantage afforded by the rectangular inner tube section can be retained as the inner tube is in itself not a pressure vessel (which would preferably require a circular cross section) because the system pressure is equal inside and outside the inner tube, the pressure being contained within the system by the outer shell.

One form of the invention will now be described by way of example with reference to the accompanying drawings in which:

FIG. 3 shows a continuous vulcanising and/or cross-linking apparatus according to the invention suitable for operation under pressure.

Figure 1A:
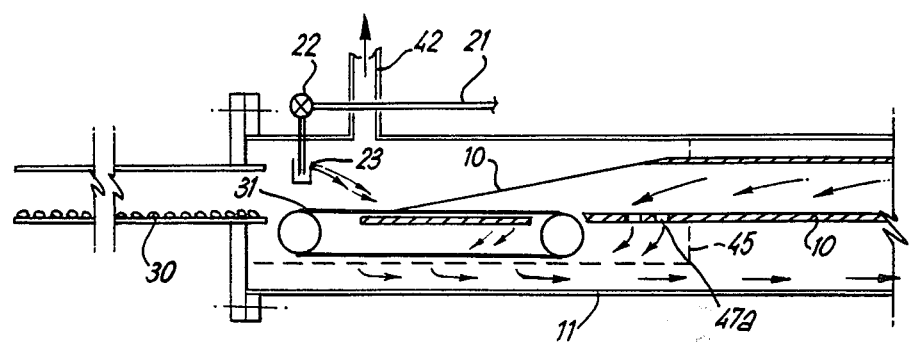
FIGS. 1A, 1B and 1C show respectively the entry end, centre section and exit end of a continuous vulcanising and/or cross-linking apparatus according to the invention.
Figure 1B:
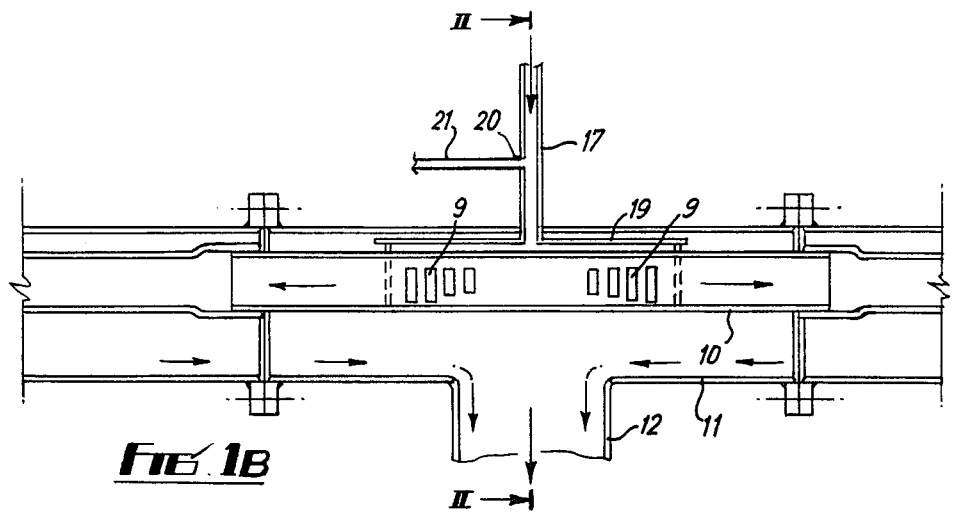
Figure 1C:
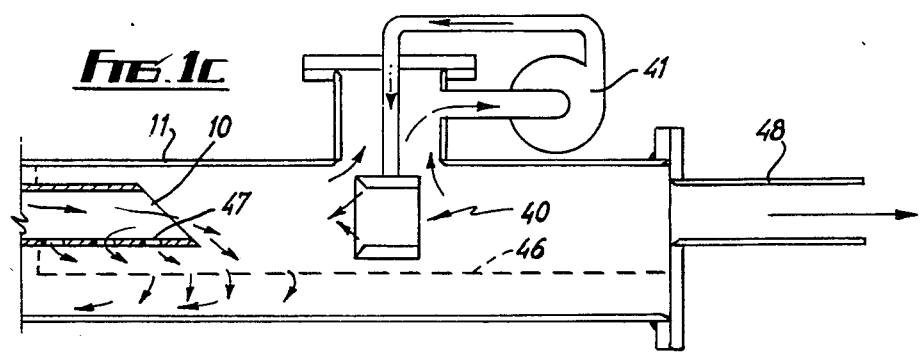
Figure 2:
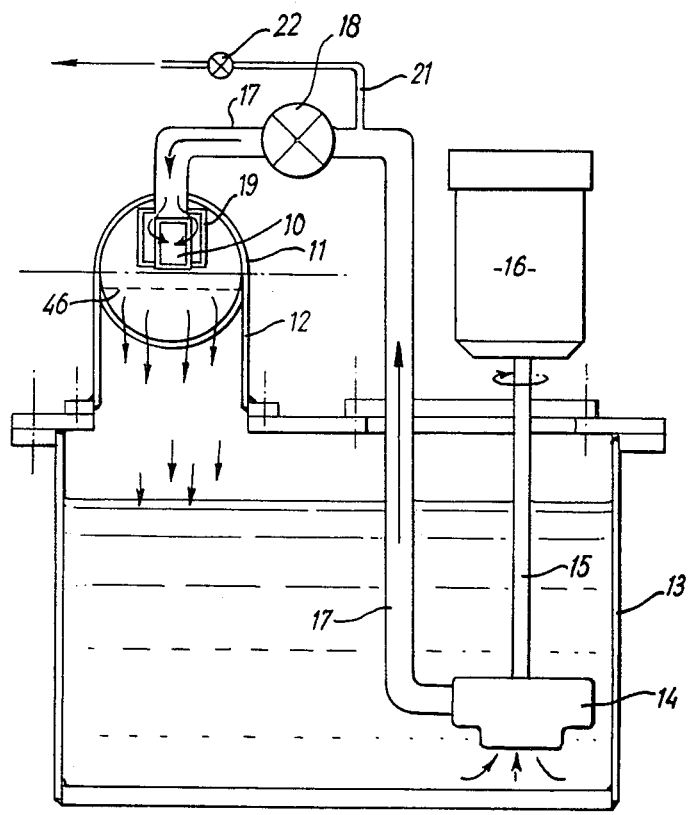
FIG. 2 shows a section on the line II—II of FIG. 1B.

In FIGS. 1A to 1C and 2 the system or apparatus shown has an elongate rectangular-section tube 10 inside an elongate horizontal circular-section shell 11. The shell has a drain duct 12 connecting with a molten salt reservoir tank 13. The tank contains an immersed pump 14 driven by a shaft 15 and motor 16. The outlet from the pump is via a pipe 17 and control valve 18 feeding a manifold 19 which supplies the centre region of the tube 10 through apertures 9 so that molten salt can be driven towards both open ends of the tube 10 and keep the tube filled with molten salt except at its ends.

A junction 20 (FIG. 1B) is provided in the pipe 17 whereby a bleed of molten salt can be taken to the entry end of the apparatus via a pipe 21, control valve 22 and weir 23 for skin curing of the product (such as an extruded rubber section which has little "green" strength).

Product entry is along a roller conveyor 30 into a region of restricted entry into the shell 11. The product is then taken along a band conveyor 31, where it receives the skin curing treatment, and then into the tube 10. For products with reinforcement (such as an electric cable where the conductors or braiding provide reinforcement) the conveyor arrangements above referred to will not normally be required.

At the exit end the product, now vulcanised and/or cross-linked, leaves the tube 10 and enters an annular hot gaseous wipe assembly 40 which is powered from a fan 41 taking the atmosphere of shell 11 as its inlet.

A fume extraction pipe 42 is provided. Certain compounds fume continuously at vulcanising temperature and thus fume extraction facilities are required with vulcanising at atmospheric pressures. When operating under pressure a controlled vent is provided.

Filter grids 45, 46 are provided at both ends of the tube 10 so that any particles of product are kept away from the circulating salt circuit. The tube 10 has perforations 47a, 47 respectively at its product inlet and outlet ends. The wiped product passes out of the system at an outlet channel 48.

In FIG. 3 the equipment located between the entry end and exit end is very similar to that already described with reference to FIGS. 1A to 1C and 2, the main differences being that the conveyors 30, 31 are not required (as the system will be used for reinforced material, such as cable); that the vent 42a is pressure controlled by suitable means 42b; that a pressurising gas inlet 43 is provided connected via valve 43a to a source 43b of gas under pressure; and that the system has a flanged tube 44 for making connection with a telescopic splice box for example to sealingly connect the apparatus to the outlet of an extruder. The construction of the shell 11 and the ancillary apparatus is such that the system can withstand operating pressure.

FIG. 3 shows a pressurised water cooling system 50 for the treated product. This has many constructional features similar to those used in the vulcanising and/or cross-linking section but in this case the inner tube 10a discharges cooling water from one end only into a shell 11a. The water reservoir tank 13a has liquid level probes 51 and a top up pump 52 as loss of coolant will arise in operation.

The tube 10a has a sealing gland 53 outside the shell 11a from which the treated and cooled product emerges.

Compared with known atmospheric continuous vulcanising and cross-linking systems as already described (and known as LCM Open Salt Baths) many advantages arise viz:

1. The system is enclosed and contained and is therefore safer for the operators, who cannot come in contact with high temperature liquid salts.
2. Fire hazards are reduced and in the event of a fire, the molten salts (which are oxygen donors in the presence of fire) can be quickly drained down to the reservoir. Any fire is thus confined to the inner tube.
3. Thermodynamically, the configuration of the system reduces the surface area for heat dissipation and the shape provides for better thermal insulation, therefore energy loss from the system is reduced in comparison to LCM.
4. The volume of salt required in the system is considerably reduced in comparison to LCM, hence the energy requirements and the "heat-up" time are also reduced.
5. Because the liquid salt is in motion, the heat transfer rate from the salt to the product to be vulcanised is increased, making possible either an increase in production speed, or a reduction in system length.
6. The ability to use a hot gas wipe within the system reduces considerably the salt consumption and the contaminations of the cooling water.

Compared with known pressurised systems, using in particular liquid salts or similar media, all the advantages of the known systems are retained and in addition:

(a) when compared with a known system using a pressurised catenary-shaped tube (which has a limitation to the specific gravity of the article being vulcanised) no significant specific gravity limitation arises.

(b) when compared with a known system using injectors to sustain flow and fill an upwardly inclined pipe, injectors are not required and the inclined pipe (which demands head or pit room) can be avoided.

(c) a long salt reservoir is avoided and the apparatus can be made to sit low on a floor and has a low heat loss.

(d) temperature compensating expansion/contraction glands as between a long product tube (which may change temperature quickly) and a long reservoir (which can only change temperature slowly) are not required with a tube having relatively free ends in a shell.

(e) a pressurised system can be provided in which circular section tubes are not essential throughout the system.

I claim:

1. Apparatus for continuous vulcanizing and/or cross-linking comprising
   elongated tube means open at its ends to permit passage therethrough of a continuous length of product to be vulcanized and/or cross-linked, said tube means being of generally straight configuration and generally horizontal orientation,
   a surrounding shell in which said elongated tube means is positioned such that the open ends of the tube means open into the interior of said shell,
   means for substantially continuously supplying an elastomeric or polymeric product to be treated such that the product to be treated will pass into said shell and through the tube means and thence out of said shell, and
   circulating means communicating with said tube for circulating a vulcanizing treatment liquid through the wall of the tube means into the tube means intermediate its ends at a rate sufficient to completely fill the tube means at least apart from its ends, but insufficient to submerge the ends of the tube means by treatment liquid in the surrounding shell,
   said shell being positioned to receive the treatment liquid issuing from the ends of the tube means,
   drain means having a drain inlet opening into said shell at a location relatively lower than said tube means for removing treatment liquid from the shell to maintain the ends of the tube means unsubmerged by treatment liquid in the shell,
   said circulating means comprising a reservoir,
   said reservoir being positioned for receiving treatment liquid which drains from said shell through said drain means.

2. Apparatus as claimed in claim 1, in which the tube means comprises a tube having end regions with apertures in the tube wall.

3. Apparatus as claimed in claim 1, in which the tube means is of rectangular cross-section with the major axis of said rectangular cross-section lying in a vertical plane.

4. Apparatus for continuous vulcanizing and/or cross-linking, comprising elongated tube means open at its ends to permit passage therethrough of a continuous length of product to be vulcanized and/or cross-linked, said tube means being of generally straight configuration and generally horizontal orientation, a surrounding shell in which said elongated tube means is positioned such that the open ends of the tube means open into the interior of said shell, means for substantially continuously supplying an elastomeric or polymeric product to be treated such that the duct to be treated will pass into said shell and through tube means and thence out of said shell, circulating means communicating with said tube means and adapted to circulate a vulcanizing treatment liquid through the wall of the tube means into the tube means intermediate its ends at a rate sufficient to completely fill the tube means, said shell being positioned to receive the treatment liquid issuing from the ends of the tube means, said circulating means comprising a reservoir, said reservoir being positioned for receiving treatment liquid which drains from said shell, and means inside said shell adjacent an end of said tube means for providing a high temperature gaseous wipe to an article being treated.

5. Apparatus for continuous vulcanizing and/or cross-linking, comprising elongated tube means open at its ends to permit passage therethrough of a continuous length of product to be vulcanized and/or cross-linked, said tube means being of generally straight configuration and generally horizontal orientation, a surrounding shell in which said elongated tube means is positioned such that the open ends of the tube means open into the interior of said shell, means for substantially continuously supplying an elastomeric or polymeric product to be treated such that the product to be treated will pass into said shell and through the tube means and thence out of said shell, circulating means communicating with said tube means and adapted to circulate a vulcanizing treatment liquid through the wall of the tube means into the tube means intermediate its ends at a rate sufficient to completely fill the tube means, said shell being positioned to receive the treatment liquid issuing from the ends of the tube means, said circulating means comprising a reservoir, said reservoir being positioned for receiving treatment liquid which drains from said shell, and means for supplying gas under pressure to the interior of said shell.

6. Apparatus as claimed in claim 5, including pressurised water means, for cooling a treated article after passage through said tube means.

7. Apparatus as claimed in claim 6, in which the pressurized water means comprises a tube within a shell, means for circulating cooling water to completely fill the tube of the pressurized water means, the water issuing from an end region of the tube of the pressurized water means, the water circulating means including a reservoir positioned for receiving water which drains from the shell of the pressurized water means.

8. Apparatus for continuous vulcanizing and/or cross-linking, comprising elongated tube means open at its ends to permit passage therethrough of a continuous length of product to be vulcanized and/or cross-linked, said tube means being of generally straight configuration and generally horizontal orientation, a surrounding shell in which said elongated tube means is positioned such that the open ends of the tube means open into the interior of said shell, means for substantially continuously supplying an elastomeric or polymeric product to be treated such that the product to be treated will pass into said shell and through the tube means and thence out of said shell, circulating means communicating with said tube means and adapted to circulate a vulcanizing treatment liquid through the wall of the tube means into the tube means intermediate its ends at a rate sufficient to completely fill the tube means, said shell being positioned to receive the treatment liquid issuing from the ends of the tube means, said circulating means comprising a reservoir, said reservoir being positioned for receiving treatment liquid which drains from said shell, and bleed means leading from the circulating means and adapted to provide a skin treatment of an article in the shell prior to treatment in said tube means.

* * * * *